United States Patent [19]

Yang

[11] Patent Number: 5,660,360
[45] Date of Patent: Aug. 26, 1997

[54] ARMREST MOUNTING STRUCTURE

[75] Inventor: Fu-Li Yang, Taipei, Taiwan

[73] Assignee: Chicony Electronics Co., Ltd., Taiwan

[21] Appl. No.: 618,558

[22] Filed: Mar. 20, 1996

[51] Int. Cl.⁶ .................................................. B43L 15/00
[52] U.S. Cl. ...................... 248/118; 248/118.1; 248/918; 400/715; 403/329
[58] Field of Search .................... 248/118, 118.1, 248/118.3, 118.5, 918, 221.11, 222.11; 403/327, 329, 326; 400/715

[56] References Cited

U.S. PATENT DOCUMENTS

| | | | |
|---|---|---|---|
| 3,526,040 | 9/1970 | Young | 403/327 X |
| 4,127,911 | 12/1978 | Cupp et al. | 403/329 |
| 5,073,050 | 12/1991 | Andrews | 248/118 X |
| 5,165,630 | 11/1992 | Connor | 400/715 X |
| 5,244,296 | 9/1993 | Jensen | 400/715 |
| 5,360,280 | 11/1994 | Camacho et al. | 400/715 X |
| 5,398,896 | 3/1995 | Terbrack | 248/918 X |
| 5,513,824 | 5/1996 | Leavitt et al. | 248/918 X |

*Primary Examiner*—Derek J. Berger
*Attorney, Agent, or Firm*—Beveridge, DeGrandi, Weilacher & Young, L.L.P.

[57] ABSTRACT

An armrest mounting structure which includes a keyboard having a front side and a plurality of bottom retaining holes spaced along the front side, and an armrest having a back side abutted against the front side of the keyboard and a plurality of coupling devices disposed at the back side and respectively fastened to the retaining holes of the keyboard, wherein each of the coupling devices comprises two vertical slots disposed on the back side of the armrest, a downward springy wall portion formed in the back side of the armrest and defined between the two vertical slots, a substantially L-shaped extension arm portion having a fixed end extending from the downward springy wall portion and a free end, and an upright plug rod portion raised from free end of the L-shaped extension arm portion and fitted into one of the retaining holes of the keyboard.

1 Claim, 12 Drawing Sheets

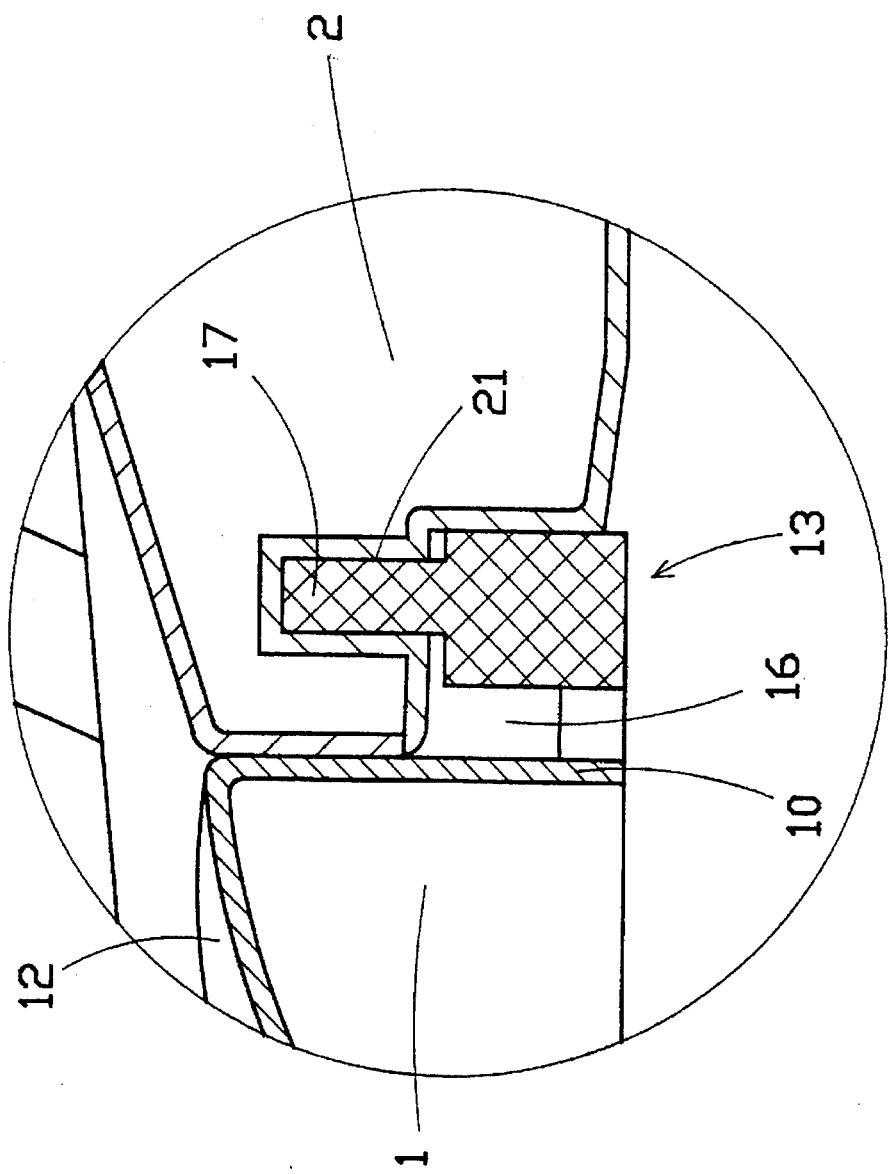

ARMREST MOUNTING STRUCTURE

BACKGROUND OF THE INVENTION

The present invention relates to an armrest mounting structure which includes a keyboard having a plurality of bottom retaining holes, and an armrest having a plurality of coupling devices at the back side respectively fastened to the bottom retaining holes of the keyboard, wherein the coupling devices are deformable so that the back side of the armrest is still maintained abutted against the front side of the keyboard when the angle of inclination of the keyboard is adjusted.

A keyboard may be equipped with an armrest for the resting of the wrists. Conventionally, the armrest can be a fixed type or a detached type. A fixed armrest is fixedly secured to the front side of the keyboard. A detached armrest is an independent device for use with the keyboard. FIG. 1 shows a detached armrest 1' used with a keyboard 2'. When in use, the detached armrest 1' tends to be moved away from the keyboard 2' by the wrists. Therefore, the user shall have to frequently adjust the position of the detached armrest 1' relative to the keyboard 2'. Furthermore, when the angle of inclination of the keyboard is adjusted, the armrest cannot be maintained closely abutted against the keyboard.

SUMMARY OF THE INVENTION

According to one aspect of the present invention, the an armrest mounting structure includes a keyboard having a plurality of bottom retaining holes, and an armrest having a plurality of coupling devices at the back side respectively fastened to the bottom retaining holes of the keyboard, wherein the coupling devices are deformable so that the angle of inclination of the keyboard can be adjusted without affecting the position of the armrest, i.e., the back side of the armrest is still maintained abutted against the front side of the keyboard when the angle of inclination of the keyboard is adjusted.

According to another aspect of the present invention, each of the coupling devices of the armrest comprises two vertical slots disposed on the back side of the armrest, a downward springy wall portion formed in the back side of the armrest and defined between the two vertical slots, a substantially L-shaped extension arm portion having a fixed end extending from the downward springy wall portion and a free end, and an upright plug rod portion raised from free end of the L-shaped extension arm portion and fitted into one of the retaining holes of the keyboard.

BRIEF DESCRIPTION OF THE DRAWINGS

FIG. 4A is a perspective view in an enlarged scale of part A of FIG. 4;

DETAILED DESCRIPTION OF THE PREFERRED EMBODIMENT

Figure 1:
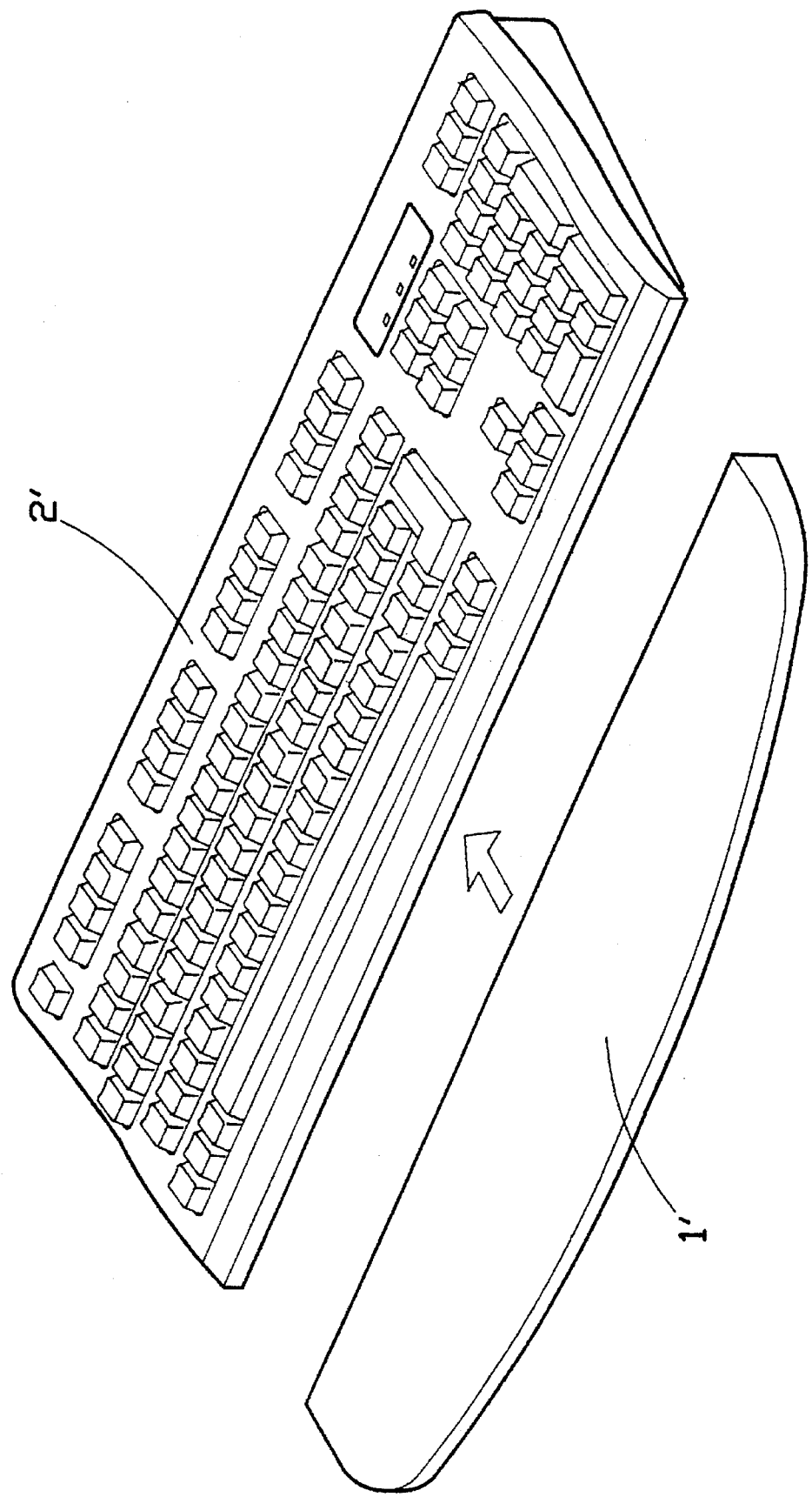
FIG. 1 is an exploded view of an armrest mounting structure according to the prior art.
Figure 2:
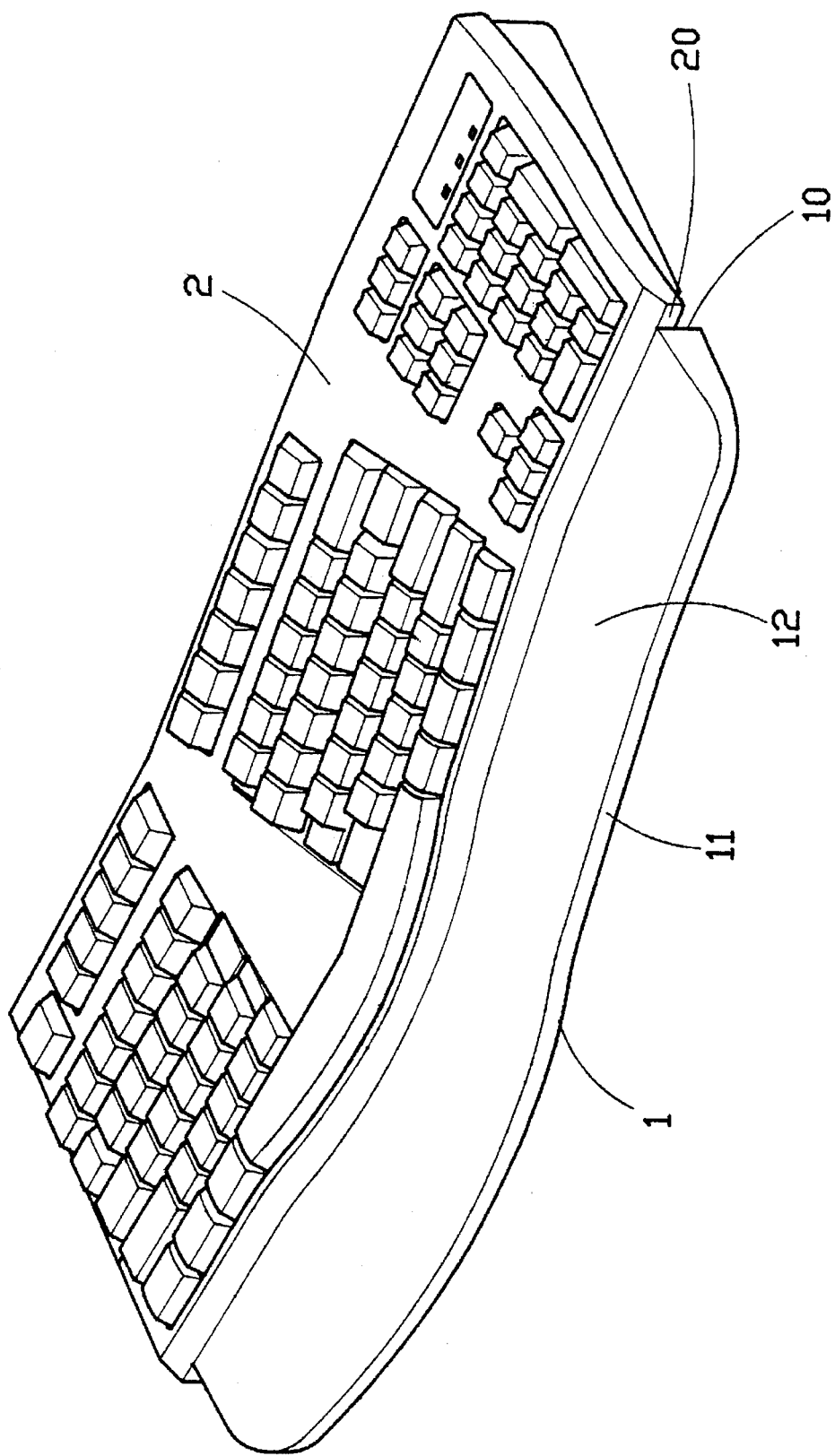
FIG. 2 is an elevational view of an armrest mounting structure according to the present invention.
Figure 3:
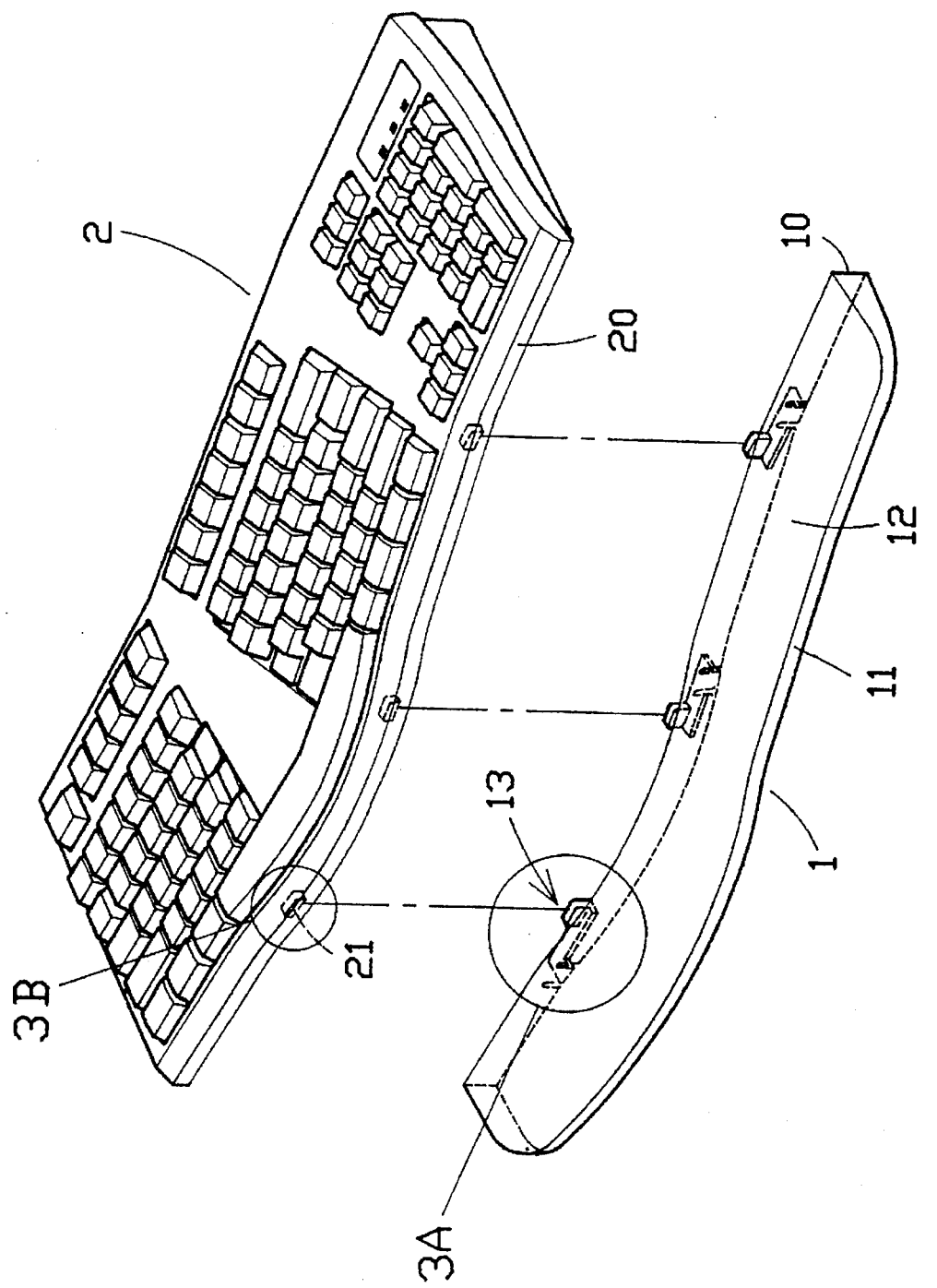
FIG. 3 is an exploded view of the adjustable armrest mounting structure shown in FIG. 2.
Figure 3B:
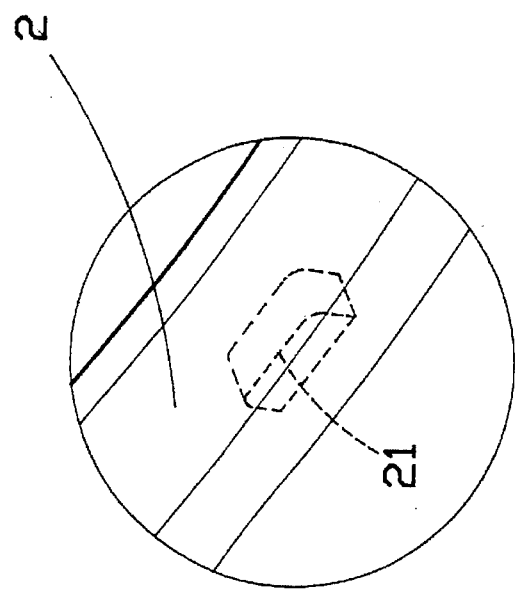
FIG. 3B is a perspective view in an enlarged scale of part B of FIG. 3.
Figure 3A:
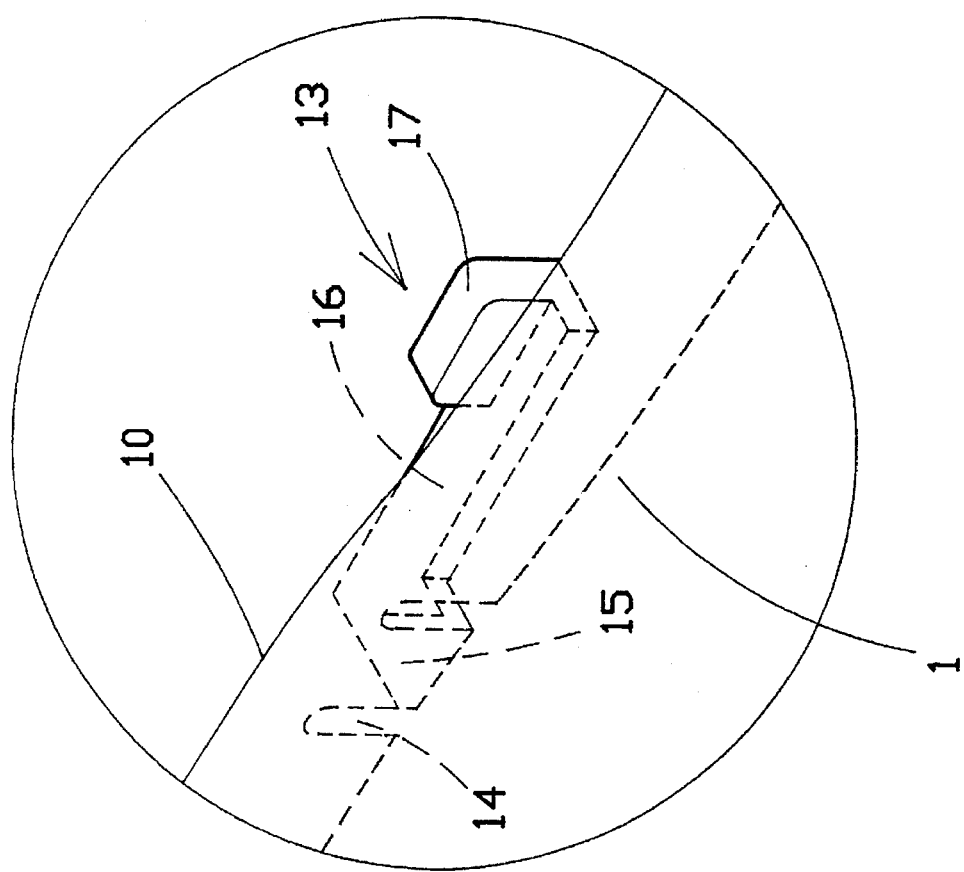
FIG. 3A is a perspective view in an enlarged scale of part A of FIG. 3.
Figure 4:
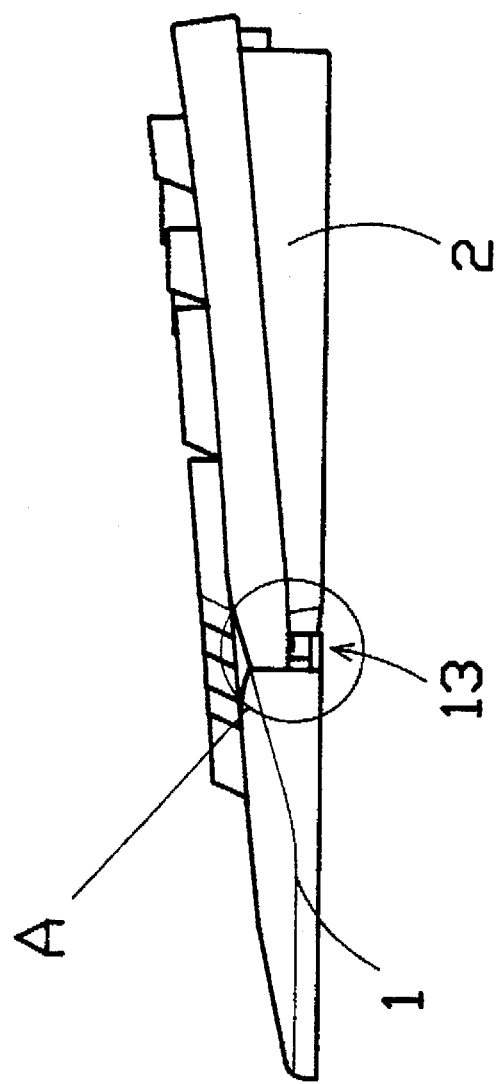
FIG. 4 is a side plain view of the adjustable armrest mounting structure shown in FIG. 2.
Figure 5:
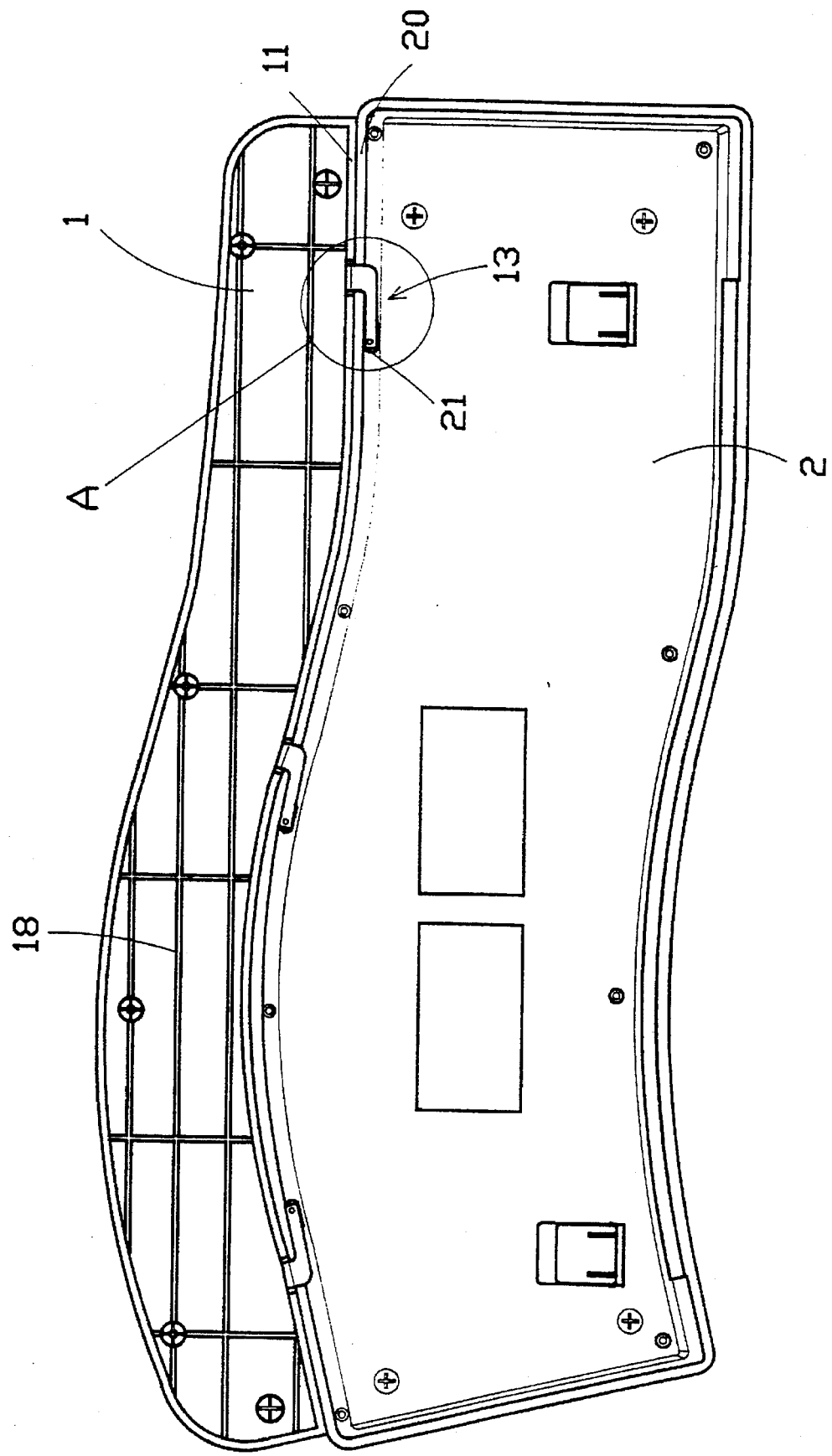
FIG. 5 is a bottom view of the adjustable armrest mounting structure shown in FIG. 2.
Figure 5A:
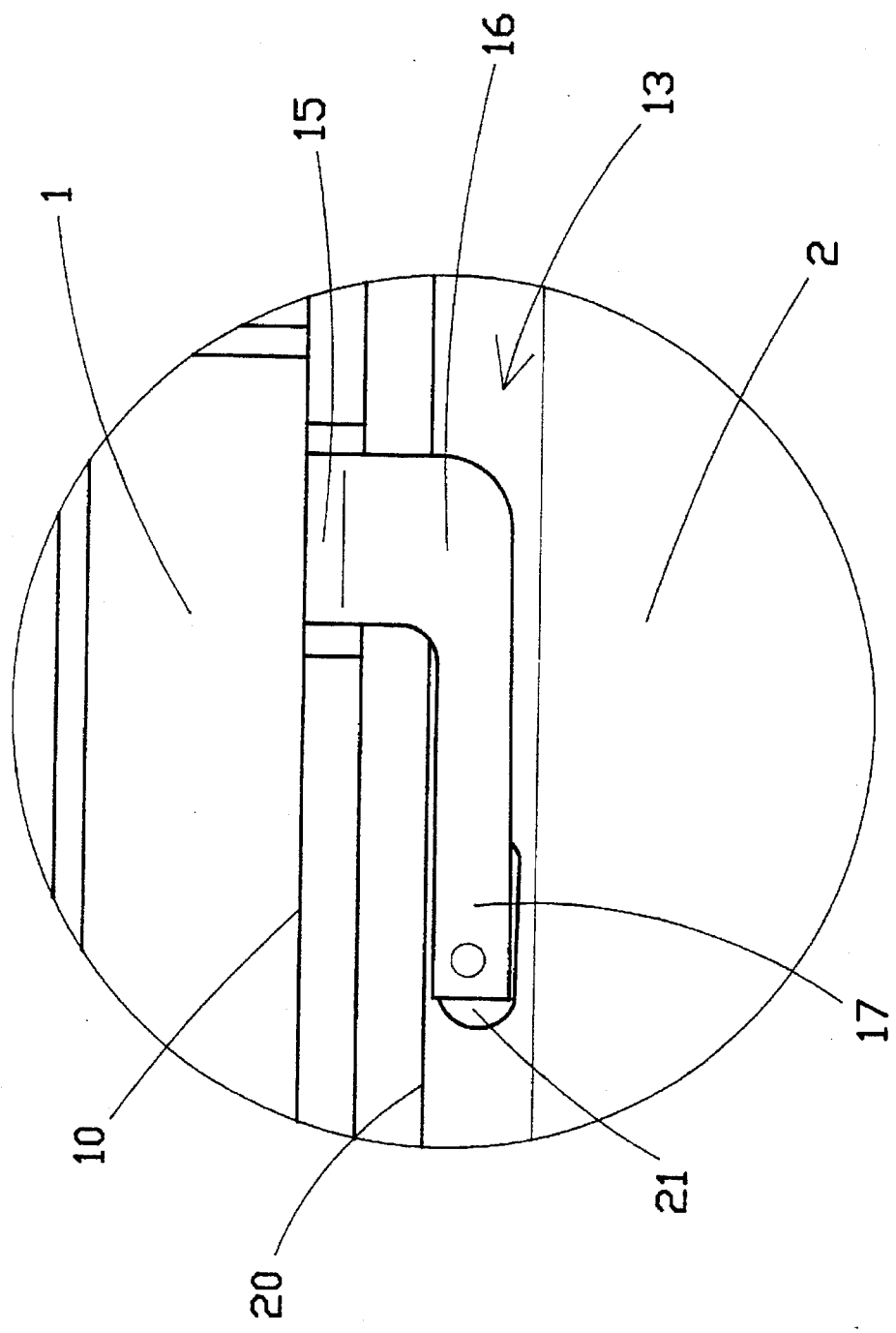
FIG. 5A is a perspective view in an enlarged scale of part A of FIG. 5.
Figure 6:
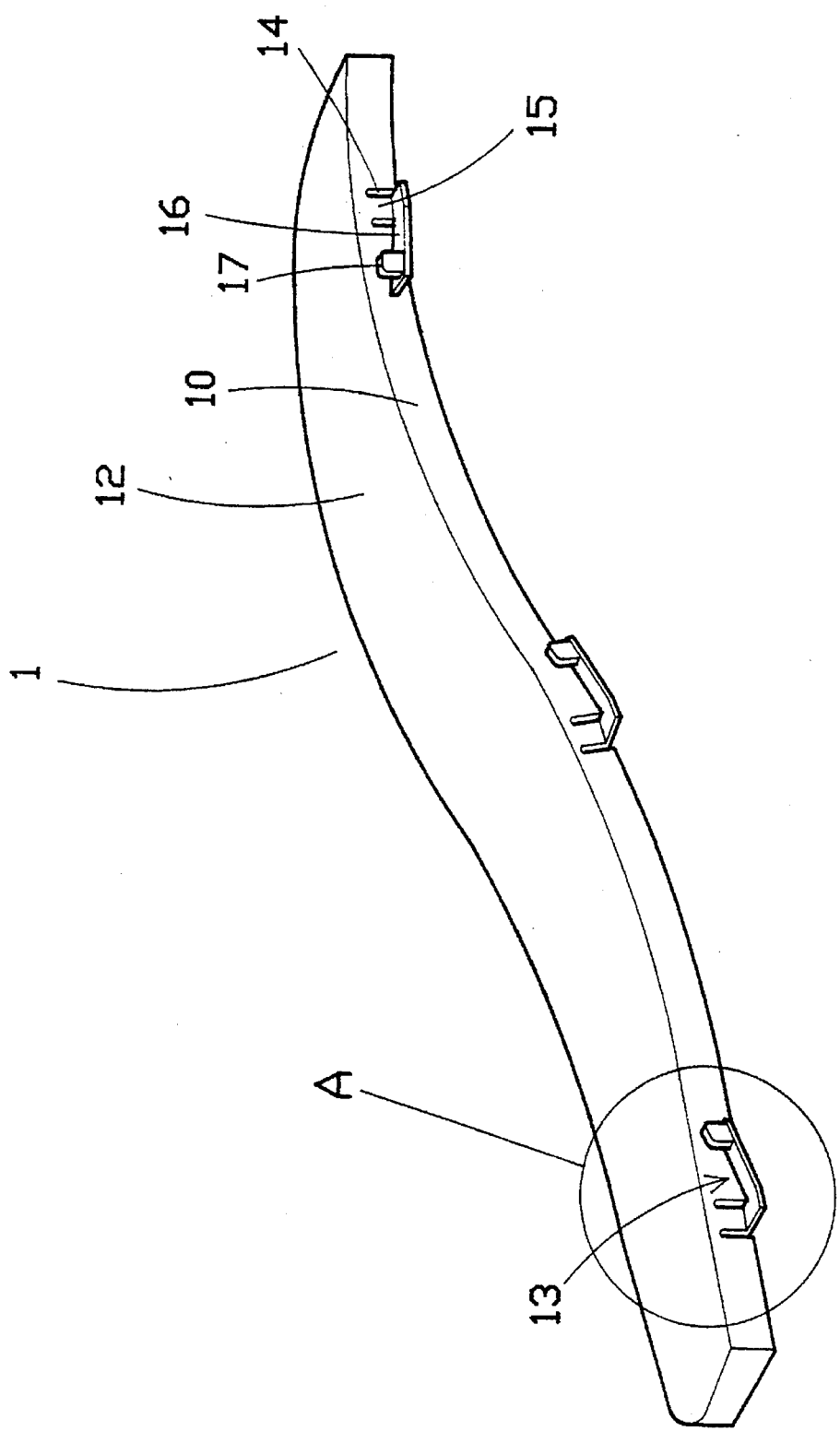
FIG. 6 is a back side view of the armrest of the adjustable armrest mounting structure shown in FIG. 2.
Figure 6A:
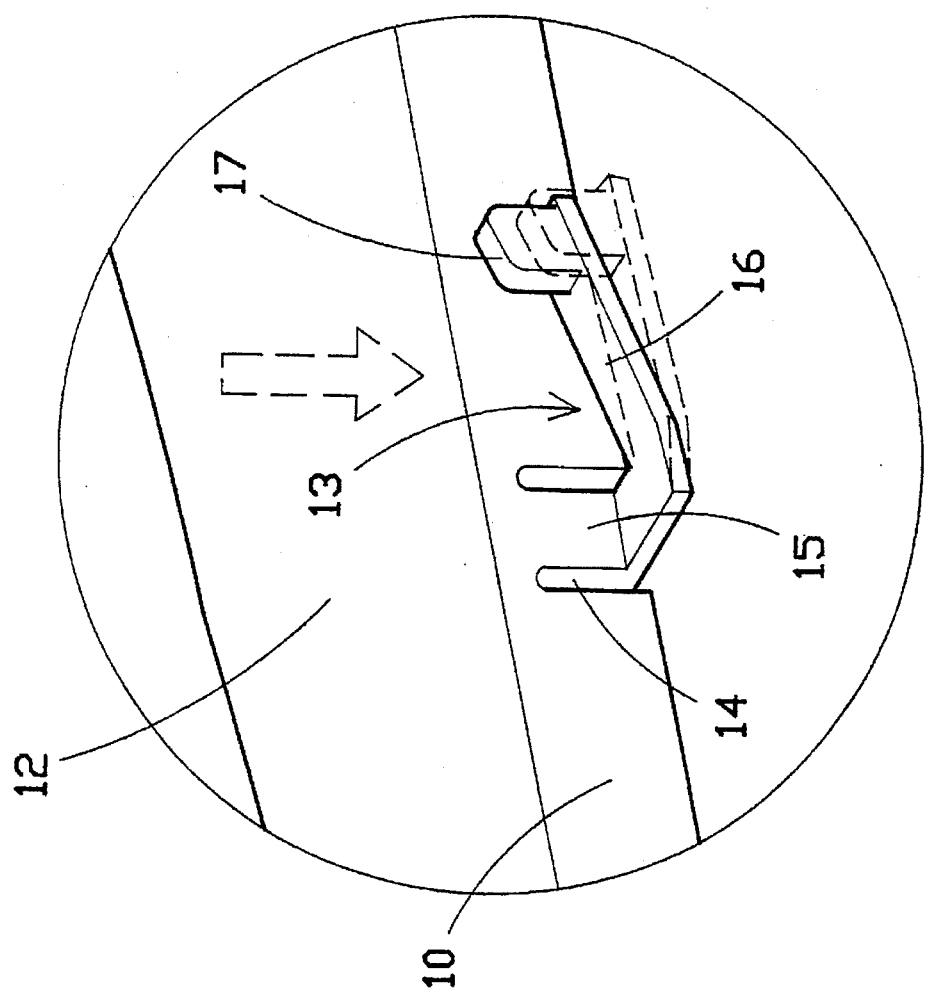
FIG. 6A is an enlarged view of part A of FIG. 6, showing the coupling device depressed.

Referring to FIGS. 2, 3, 3A, 3B, and 4, the armrest 1 and the keyboard 2 are approximately equal in length. The back side 10 of the armrest 1 fits over the front side 20 of the keyboard 2 so that the armrest 1 can be closely attached to the front side 20 of the keyboard 2. The top side 12 and front side 11 of the armrest 1 are orthopedically engineered for the resting of the wrists comfortably. The armrest 1 is a hollow shell having a open bottom side and reinforced with inside ribs 18 (see FIG. 5).

Referring to FIGS. 5, 5A, 6, and 6A, and Figures from 2 to 4A again, the armrest 1 has a plurality of coupling devices 13 spaced along the back side 10 for fastening to respective retaining holes 21 at the bottom of the keyboard 2. Each of the coupling devices 13 comprises two vertical slots 14 disposed on the back side 10, a downward springy wall portion 15 formed in the back side 10 and defined between the vertical slots 14, a substantially L-shaped extension arm portion 16 extending from the bottom end of the downward springy wall portion 15, and an upright plug rod portion 17 raised from the free end of the L-shaped extension arm portion 16 for fitting into one of the retaining holes 21 of the keyboard 2. By fitting the upright plug rod portions 17 of the coupling devices 13 of the armrest 1 into the retaining holes 21 of the keyboard 2, the armrest 1 is fastened to the keyboard 2 for the resting of the wrists. When the armrest 1 and the keyboard 2 are fastened together, the back side 10 of the armrest 1 is abutted against the front side 20 of the keyboard 2.

Figure 7:
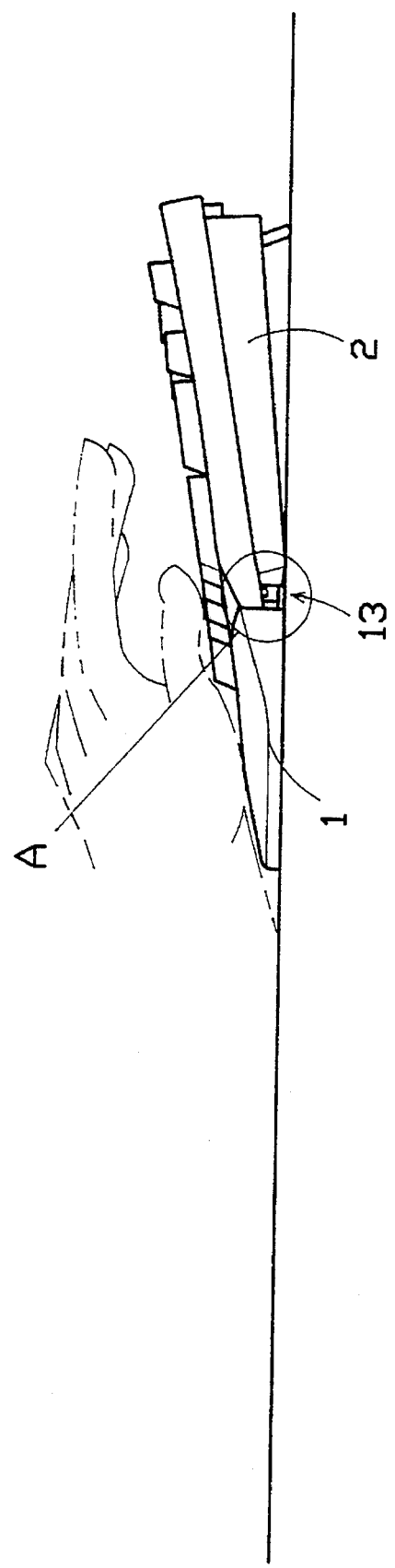
FIG. 7 is similar to FIG. 4 but showing the angle of inclination of the keyboard adjusted.
Figure 7A:
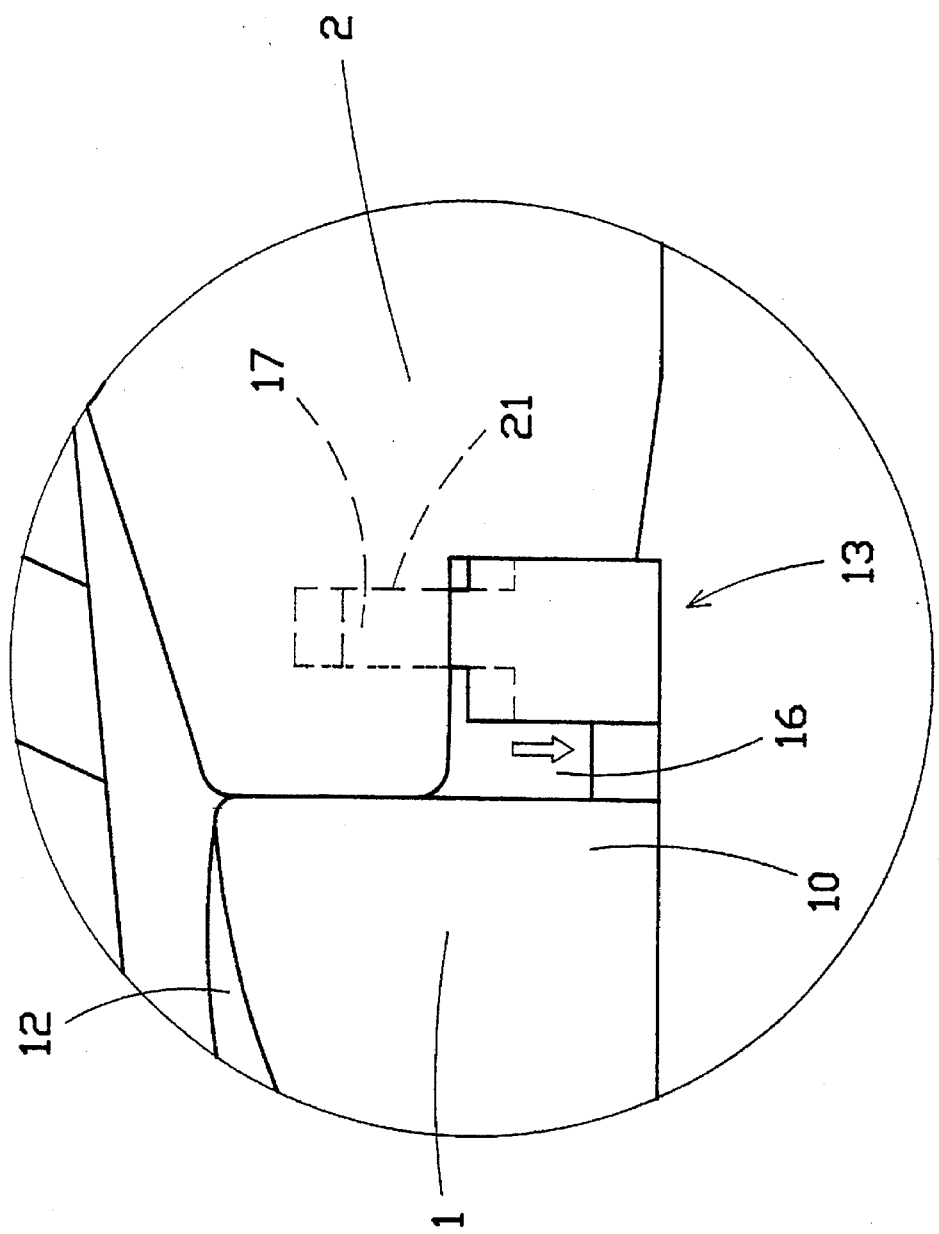
FIG. 7A is an enlarged view of part A of FIG. 7.

Referring to FIGS. 7 and 7A, when the legs of the keyboard 1 are lifted to support the keyboard 1 is a-forwardly sloping position as shown in FIG. 7, the L-shaped extension arm portions 16 of the coupling devices 13 are bent downwards and deformed so that the position of the armrest 2 is maintained unchanged. Therefore, the position of the armrest 2 is not changed when the position of the keyboard 1 is adjusted.

While only one embodiment of the present invention has been shown and described, it will be understood that various modifications and changes could be made without departing from the spirit and scope of the invention disclosed.

What the invention claimed is:

1. An armrest mounting structure comprising a keyboard having a front side and a plurality of bottom retaining holes spaced along the front side, and an armrest having a back side abutted against the front side of said keyboard and a plurality of coupling devices disposed at the back side and respectively fastened to the retaining holes of said keyboard, wherein each of said coupling devices comprises two vertical slots disposed on the back side of said armrest, a downward springy wall portion formed in the back side of said armrest and defined between said two vertical slots, a substantially L-shaped extension arm portion having a fixed end extending from said downward springy wall portion and a free end, and an upright plug rod portion raised from free end of said L-shaped extension arm portion and fitted into one of the retaining holes of said keyboard.

* * * * *